(12) United States Patent
Goda

(10) Patent No.: US 9,243,958 B2
(45) Date of Patent: Jan. 26, 2016

(54) IMMERSION TYPE SENSOR FOR MEASURING TEMPERATURE

(76) Inventor: Jyoti Goda, Orissa (IN)

(*) Notice: Subject to any disclaimer, the term of this patent is extended or adjusted under 35 U.S.C. 154(b) by 593 days.

(21) Appl. No.: 13/530,254

(22) Filed: Jun. 22, 2012

(65) Prior Publication Data

US 2012/0327971 A1    Dec. 27, 2012

(30) Foreign Application Priority Data

Jun. 24, 2011    (IN) .............................. 839/KOL/2011

(51) Int. Cl.
*G01K 1/22* (2006.01)
*G01D 21/00* (2006.01)
*G01J 5/00* (2006.01)
*G01J 5/04* (2006.01)
*G01J 5/08* (2006.01)

(52) U.S. Cl.
CPC ................. *G01J 5/004* (2013.01); *G01J 5/048* (2013.01); *G01J 5/0821* (2013.01)

(58) Field of Classification Search
USPC .......................................... 374/179, E07.004
See application file for complete search history.

(56) References Cited

U.S. PATENT DOCUMENTS

| | | | | |
|---|---|---|---|---|
| 4,737,038 A | * | 4/1988 | Dostoomian | 374/139 |
| 5,302,027 A | * | 4/1994 | Park | 374/139 |
| 5,364,186 A | * | 11/1994 | Wang et al. | 374/126 |
| 6,357,910 B1 | * | 3/2002 | Chen et al. | 374/131 |
| 6,682,216 B1 | * | 1/2004 | Small, IV et al. | 374/126 |
| 7,197,199 B2 | * | 3/2007 | Cuypers et al. | 385/12 |
| 7,748,896 B2 | * | 7/2010 | Dams et al. | 374/139 |
| 7,891,867 B2 | * | 2/2011 | Dams et al. | 374/139 |
| 2005/0175065 A1 | * | 8/2005 | Coleman, Jr. | 374/139 |

FOREIGN PATENT DOCUMENTS

JP    7229791 A    8/1995

OTHER PUBLICATIONS

Extended European Search Report in EP12173042.8, Mailed Oct. 10, 2012.

* cited by examiner

*Primary Examiner* — Lisa Caputo
*Assistant Examiner* — Nasir U Ahmed
(74) *Attorney, Agent, or Firm* — Wolf, Greenfield & Sacks, P.C.

(57) ABSTRACT

A device for measuring the temperature of molten metal irrespective of the nature of the metal, particularly, an immersion/contact type temperature sensing device involving optical fiber which can be universally used for different materials and would be adapted for safe and repetitive immersion in molten metal for measurement of molten metal temperatures and the like. The proposed immersion/contact type temperature sensing device involves combination two-color and multi-color pyrometric detection technique is capable of cost effective and discrete-time temperature measurement of molten metal. The advancement is thus directed to serve as a ready and fast accurate measurement of molten metal temperature and the like.

24 Claims, 2 Drawing Sheets

IMMERSION TYPE SENSOR FOR MEASURING TEMPERATURE

CROSS-REFERENCE TO RELATED APPLICATION AND CLAIM OF PRIORITY

This application claims priority to Indian Patent Application No. 839/KOL/2011, filed on Jun. 24, 2011, which is incorporated herein by reference in its entirety.

BACKGROUND

1. Field of the Invention

The present invention relates to advancements in measurement of temperature of molten metal and the like and, in particular, to advancements in immersion-type sensor for measurement of temperature of molten metals and more particularly to an optical fiber based temperature sensor. Importantly, the sensor of the invention is directed to a user friendly and cost effective discrete-time temperature measurement of molten metal. Advantageously the invention directed towards the development of a temperature sensor device, which is invulnerable to external electromagnetic radiation, is cost effective and not prone to changes in material emmissivities and can be used to measure the temperature of the molten metal irrespective of the nature of the metal.

2. Description of the Related Art

The knowledge of liquid metal temperature is essential as it directly influences the quality of the end product as well as the productivity of the metal plant. To measure the molten metal temperature, different immersion type temperature measurement techniques are used. Amongst all these techniques, optical temperature measurement and thermoelectric temperature measurement are widely used.

Traditionally, the immersion type thermoelectric temperature sensors are based on thermocouples but these are not viable in several applications. Specifically, they are not immune to electromagnetic radiation, have slow response times and allow for low sampling frequencies. The use of non-contact pyrometry for the measurement of steel temperatures is a known technique and several patents cover various details of this technique—for. e.g. U.S. Pat. No. 4,462,698, U.S. Pat. No. 5,769,540 etc. The major drawback of non-contact pyrometry is that the incident radiation is received not only from the hot body to be measured but other hot bodies that are invariably present in the vicinity. These bodies have different emissivities and introduce complex errors that are difficult to quantify and eliminate. In general, non-contact pyrometry techniques have high errors and some might be outside the tolerance of those acceptable to the industry.

It is also known in the art to involve contact/immersion type temperature sensors wherein instead of picking up radiation from the surface of a hot body and analyzing it for temperature, a probe containing an optical fiber is immersed into the metal. U.S. Pat. No. 6,004,031 and U.S. Pat. No. 6,357,910 B1 describe a similar technique for temperature measurement wherein an optical fiber in reel form is carried. One end of the reel is immersed into the molten metal and the other end is connected to a radiation thermometer, which is essentially an optical pyrometer. However, as a consequence of using the optical fiber in a reel form a length of fiber equal to the thickness of the slag is always wasted on each immersion. This causes losses of the expensive optical fiber during each measurement.

A second problem associated with the presently available contact/immersion type measurements is that when the tip of the optical fiber which is metal-covered is kept immersed into the molten steel for a long time after detecting the temperature of the molten steel, the metallic coating layer of the optical fiber becomes gaseous in the high temperature environment. Then, the generated gas is ejected from the tip of the optical fiber, and is ignited if oxygen is present. To prevent such an accident, the tip of the metal-covered optical fiber is drawn up from the molten steel immediately after measuring the temperature of the molten steel. Then, the tip once used as the temperature measuring element is cut off before next temperature measurement cycle, and the fresh tip is immersed into the molten steel at the next measuring cycle.

The third drawback is that the signal from the hot body is significantly attenuated along the length of the fiber. Thus, the signal received by the radiation thermometer is weak and the signal to noise ratio is low. In addition, the attenuation is dependent non-linearly on the length and since the length of the fiber keeps changing, continuous adjustment has to be made for this changing attenuation. This introduces errors into the measurement.

The fourth limitation is that the above discussed techniques are designed to be continuous measurement techniques and are not suitable in areas where only instantaneous temperature at critical instances of time is required. By using the continuous techniques, the user is forced to measure the temperature continuously over the entire time range and even during phases when the temperature is non-critical. This leads to economic inefficiency Apart from the above constructional limitations of the present available measuring systems, it is also experienced that such systems also have some limitations in achieving accurate and faster measurement of temperature. The typical techniques used for temperature measurement by radiation pyrometers in the industry are one-color and two-color pyrometry. In one-color pyrometer, the wavelengths are not differentiated and the entire radiation incident on the pyrometer is measured and correlated to temperature using the Stefan-Boltzmann law. In two color pyrometry, two wavelengths are selected and the intensities of the radiation at these two wavelengths is measured and correlated to temperature by using the Planck's Law. However, Planck's Law is a generic correlation between the temperature of the hot body and the wavelength and intensity of the emitted radiation. By reducing the Planck's Law to only 2 wavelengths, a drastic simplification is effected. An inherent assumption is that the emissivity of the body does not change with wavelength. Multi-wavelength pyrometry eliminates the 2-color pyrometry assumptions. In addition, any chemistry effects on the spectrum are eliminated. Multi-wavelength pyrometry is a known technique and U.S. Pat. No. 6,357,010 B1 discloses a method and apparatuses for measuring the temperature of a radiating body utilizing multi-wavelength pyrometry techniques. However, on account of the quantity of data to be handled to accurately predict the temperature, multi-wavelength pyrometry tends to involve intense, time-consuming processing steps.

Thus all such known techniques especially contact type temperature sensor for the measurement of molten metal temperature are either devices which are complex and/or cost extensive to use and hence not convenient for wide scale repetitive use for measurement of temperature of the molten metal and/or have limitations in reaching to the desired accurate and faster determination of temperature of molten metal/steel. There has been thus a need in the art to develop a method and apparatus for molten metal temperature measurement customized for multiple uses and adaptable to any type of metal and which would also be accurate and faster for the purposes of desired temperature determination.

SUMMARY

It is thus the basic object of the present invention to develop an optical fiber based temperature sensor for immersion-type temperature measurements at discrete time-points.

A further object of the invention is to provide for advancement in immersion-type temperature measurement devices which would minimize the effects of variations in object emissivity, external radiation sources and changes in emissivity of external radiation sources on the measured temperature.

Another object of the present invention is to provide for a versatile immersion-type temperature sensor that can be universally used for different materials and would be adapted for safe and repetitive immersion in molten metal for measurement of molten metal temperatures and the like.

Another object of the present invention is directed to the development of an immersion-type temperature sensor that would be cost-effective, user friendly and easy to manufacture.

Thus according to the basic aspect of the present invention there is provided an immersion type sensor for measurement of temperatures of molten metal and the like comprising of:

a. A probe receptacle adapted for immersion in molten metal;

b. At least one optical fiber housed within the probe receptacle such as to favour detection and collection of optical signals including radiation emitted by molten metal, said probe receptacle adapted such that radiation incident on the fiber becomes closer to the blackbody emissivity;

c. A detector module operatively connected to the said optical fiber for desired measurement of the molten metal temperature based on said detected and collected radiation emitted by molten metal.

According to another aspect the said immersion type sensor for measurement of temperatures of molten metal comprises a protective refractory material surrounding the optical fiber firmly holding the optical fiber in place in said probe receptacle.

In accordance with another aspect the immersion type sensor the said optical fiber in said probe receptacle is provided with a coating of buffer material or coating material comprising metallic elements to improve the strength.

According to another aspect in the immersion type sensor the probe receptacle is obtained selectively of anyone or more of ceramic including selected from resin coated sand, aluminum oxide, cordierite, magnesia carbon, graphite, zirconia etc; plastic including Bakelite; and metal including stainless steel.

According to another aspect in the immersion type sensor the optical fiber is comprised of anyone or more of silica glass, plastic coated silica, quartz and sapphire, calcium fluoride, magnesium fluoride etc. and other appropriate transmitting optical fibers for measurement of temperatures.

According to yet another aspect in the immersion type sensor the protective material comprises refractory materials preferably selected from aluminum oxide, resin-coated sand, magnesia carbon, zirconia or quartz, mixed with organic and inorganic binders.

According to a further aspect in the immersion type sensor the protective material comprises a solid block of refractory preferably Aluminium oxide, graphite, magnesia carbon, zirconia and the like.

According to another aspect in the immersion type sensor the said probe receptacle is cup shaped and houses the optical fiber with its front face exposed such that when the probe receptacle is immersed in the molten metal the optical fiber front face directly comes in contact with the molten metal.

According to yet another aspect in the immersion type sensor the said probe receptacle is cup shaped refractory covering and completely surrounds the optical fiber including the front face of the optical fiber facing the molten metal such that the optical fiber remain protected from contacting with the metal by a said refractory covering preferably having a high thermal conductivity including preferably containing carbon.

In accordance with another aspect of the invention the immersion type sensor the said probe receptacle operatively connected means adapted for multiple immersions and multiple measuring of molten metal temperature.

According to another aspect in the immersion type sensor the probe receptacle is operatively connected to the lance to facilitate the immersion of the probe receptacle having the optical fiber into the molten metal and taking it out after use.

According to another aspect in the immersion type sensor said detector module is operatively connected to the optical fiber via an insulated optical cable housed in the said lance for decoding the optical signal received from the fiber.

In accordance with another aspect in the immersion type sensor the said detector module comprises photo-detector circuitry adapted to generate digital signal according to the input optical signal and to a processing unit, where the digital signal is interpreted to any suitable physical value including temperature of molten metal.

According to another aspect in the immersion type sensor the said detector module comprises a pyrometer adapted for sensing the temperature of the molten metal based on the input signal received from the said optical fiber.

According to another aspect the immersion type sensor comprises a calibration light source to calibrate the optical fiber sensor before every immersion in molten metal.

In accordance with another aspect the immersion type sensor the said optical fiber is adapted for measuring temperatures from 150° C.-2000° C.

In accordance with another aspect in the immersion type sensor the said refractory covering is provided with surface roughness to improve emissivity.

According to another aspect the immersion type sensor comprises encasing the entire probe receptacle in refractory protective material to provide a longer residence time in molten metal.

According to another aspect in the immersion type sensor the optical fiber is encased in a protective tubular sheath preferably steel sheath which in turn is affixed to the probe receptacle involving a protective material.

According to another aspect the immersion type sensor the optical fiber is selectively provided for measuring temperature of molten metal selected from any metal in the periodic table.

In accordance with another aspect of the invention there is provided a method for measurement of temperature of molten metal and the like involving an immersion type sensor comprising:

a. immersing the probe receptacle into the molten metal;

b. collecting the optical signals including emitted radiations from the molten metal via the optical fiber housed in the probe receptacle;

c. directing the optical signal towards the detector module and carrying out processing of the optical signal in said detector module to measure the temperature of molten metal.

According to another aspect in the above method for measurement of temperature of molten metal, said temperature of the molten metal is detected in said detector module based on the optical signal from said optical fiber involving multi-color pyrometry techniques.

According to another aspect in the above method for measurement of temperature of molten metal said pyrometric technique comprises of:

a. receiving the radiation from the metal captured through said optical fiber in said detector module;

b. estimating the temperature by using 2-color pyrometry formula, where the two wavelengths are randomly selected; and c. refining the estimated temperature by using multi-color pyrometry technique.

According to another aspect the method for measurement of temperature of molten metal comprises calibration of the sensor by using known light source before every immersion.

The present invention thus involves the development of an immersion-type sensor for measuring the temperature of molten metals. The sensor probe basically comprises of a receptacle within which is contained an optical fiber for detecting the temperature. Preferably, the receptacle is made of a ceramic material but it can be composed of plastic/metal or other materials capable of withstanding high temperatures as well. Preferably, the receptacle is cup shaped for accommodating the optical fiber. The optical fiber can be in the form of a standard single/multimode glass fiber or sapphire fiber. The diameter of the fiber ranges from 1 µm to 30 mm. preferably, the diameter is between 9 µm and 1 mm. The fiber detects and collects the radiation being emitted by the molten metal and transmits it to the detector module. Preferably, the buffer material or coating material of the optical fiber contains metallic elements to improve the strength. The sensor can also be protected by a suitable slag cap to prevent the slag or other materials from sticking to the sensor.

Importantly, within the probe body, the optical fiber is surrounded on the sides by a suitable protective material. This protective material is preferable made from a refractory material. The refractory material performs several functions including the following:

First, the radiation incident on the fiber becomes closer to blackbody radiation and the emissivity becomes closer to the blackbody emissivity.

Second, radiation emitted from external sources with varying emissivity is prevented from being incident on the fiber.

Third, the fiber is supported within the probe.

In one embodiment of the invention, the optical fiber is protected on the top face by the refractory material of known emissivity and good thermal conductivity. The optical fiber never comes in direct contact with the molten metal. Only the refractory material comes in contact with the liquid metal and the temperature of the refractory material is measured and calibrated to the temperature of the molten metal. The advantage of this is that changes in the metal composition and emissivity do not impact the temperature and the probe accurately measures the temperature. In addition, this probe can be used universally for all metals and materials since the variation in metal emissivity for different metals have no impact on the measured temperature.

In a separate embodiment, the optical fiber is contained within a tube, which is contained within the protective refractory material. Preferably, the tube is made of metal or quartz.

This sensor is immersed into the molten metal by means of a lance that is made of metal or ceramic or other materials capable of withstanding temperatures in the range of 1500°-1700° C. Within the lance is contained an armored optical fiber which is connected to the optical fiber in the probe via a contact block. The lance is protected from the liquid metal by a protective coating that is composed of paperboard or other suitable insulating materials depending on the duration of the immersion of the sensor in the molten metal, and is firmly attached to the probe via an adhesive. The paper board is wound tightly into a paper tube and with a suitable adhesive so that it does not burn in contact with the molten meal but burns layer by layer and gives adequate time for the immersion and withdrawal of the sensor from the molten metal.

At the remote end of the lance, the optical fiber is connected to a detection module. The detection unit can be comprises of photo-detector or multi-color pyrometer. In case of photo-detector circuit, that generates a digital output according to the input optical signal which can be interpreted in terms of different physical values such as temperature in degrees Celsius or Fahrenheit and monitored by a computer whereas in the case of multi-color pyrometer the temperature is determined by multi-color pyrometry formula. Depending on the thickness of the protective sheath used, the probe can be immersed multiple times if the temperature being measured is lower than the melting point of the optical fiber material.

The details of the invention, its objects and advantages are explained hereunder in greater detail in relation to the non-limiting exemplary illustrations as per the following accompanying drawings.

DETAILED DESCRIPTION OF EXEMPLARY EMBODIMENTS

Figure 1:
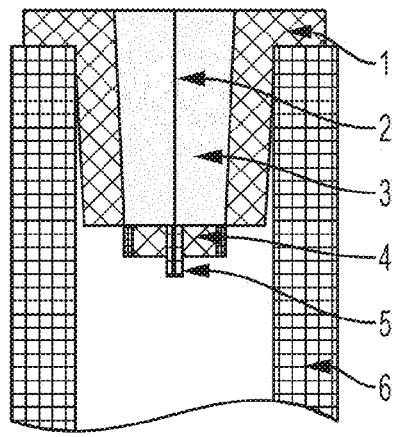
FIG. 1 & FIG. 2 show the schematics of two preferred embodiments of the immersion type sensor for measurement of temperatures of molten metal and the like in accordance with the present invention.

Reference is first invited to accompanying FIG. 1 which is a representation of the sensing probe of an immersion type temperature sensor in accordance with an embodiment of the present invention. As shown in the said figure the sensor basically comprises a cup shaped receptacle 1 for accommodating optical fiber 2 enclosed within a protective refractory material 3. A single/multi mode glass/quartz/sapphire/other optically conducting material optical fiber 2 with a diameter ranging from 1 µm to 30 mm (preferably 9 µm to 1 mm) is used along with protective refractory material 3 made of aluminum oxide, resin coated sand, magnesia carbon, zirconium oxide or graphite mixed with organic and inorganic binders to provide structural support to the fiber and shift the emissivity towards blackbody emissivity. A clip 4 is shown provided for providing better alignment between the sensor probe and the lance during immersion, a pin 5 is fixed to the clip for alignment of the optical fiber in the probe setup with the optical cable present on the lance as shown in the FIG. 3, a tube 6 made of paperboard for containing the setup.

Figure 2:
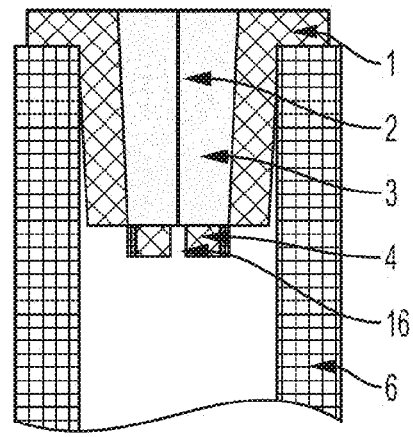

FIG. 2 shows a pictorial representation of another type of sensing probe of the immersion type temperature sensor where the setup, comprising all the functional elements as stated in the above embodiment of FIG. 1, except the use of pin 5. Instead of using pin as connector device, in this embodiment a slot 16 is fixed to the clip for connecting the probe setup with the pin present on the lance.

Figure 4:
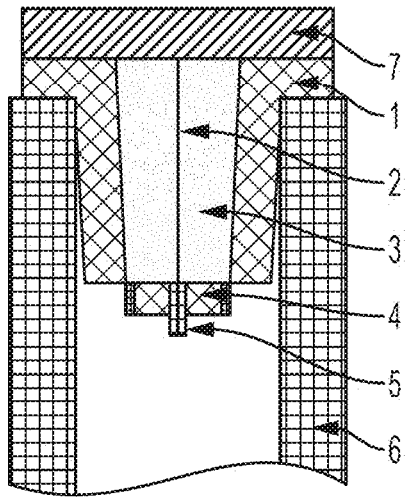
FIG. 4 and FIG. 5 show the schematics of further exemplary embodiments of the immersion type sensor for measurement of temperatures of molten metal and the like according to the present invention.
Figure 6:
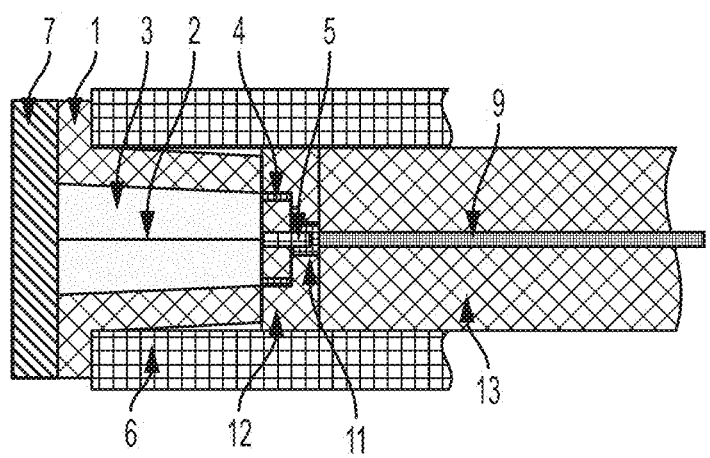
FIG. 6 depicts an embodiment of an immersion type sensor.

FIG. 4 and FIG. 6 show the schematics of further exemplary embodiments of the sensing probe according to the invention. All the functional elements are same as the embodiment as shown in the FIG. 1 with an additional refractory material covering 7 over the top side of the optical fiber.

Figure 5:
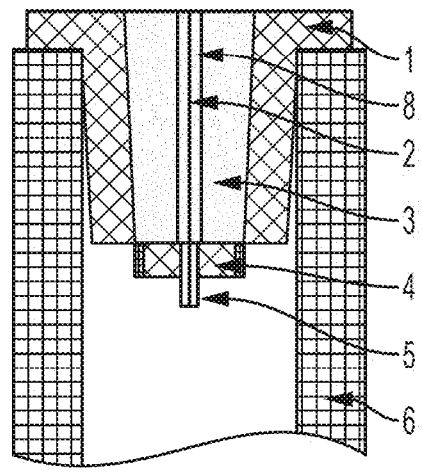

FIG. 5 shows the schematic of further exemplary embodiment of the sensing probe according to the invention. In this set-up all the functional elements are same as the embodiment as shown in the FIG. 21 with an additional cylindrical tube 8 surrounding the whole optical fiber.

Figure 3:
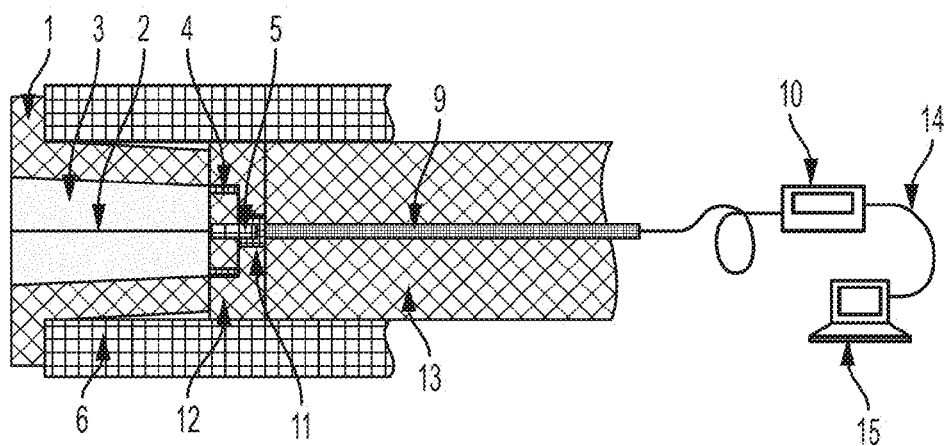
FIG. 3 shows a schematic of an exemplary an immersion type sensor for measurement of temperatures of molten metal and the like with a detector module according to the present invention.

FIG. 3 shows a illustrative representation of an exemplary assembly of the immersion type temperature sensor in accordance with the invention where the setup, which includes any one of sensing probes as shown in FIG. 1, 2, 4 or 5 followed by a lance 13 made of metal/ceramic or other materials capable of withstanding high temperature for containing and supporting an insulated optical cable 9 for directing the signal coming from the sensing probe towards the detection unit 10, a connector 11 for connecting the optical cable with the optical fiber, contact block 12 for containing the connector 11, a detection unit 10 comprising photo-detector or multi-color pyrometer, an electrical cable 14 for transmitting the detector output to the computer 15.

Thus, in the exemplary embodiments as shown in FIGS. 1 and 2, the sensing probe basically comprises of a cup shaped receptacle 1 within which is contained an optical fiber 2 for capturing and transmitting the electromagnetic radiation coming from the molten metal. The receptacle should be made of such materials that capable of withstanding high temperature as the receptacle is immersed into the molten metal. Preferably, the sensor body is made of a ceramic material but it can be composed of plastic/metal. The optical fiber with a diameter ranges from 1 um to 30 mm (preferably 9 um to 5 mm) can be in the form of a standard single-mode/multimode glass fiber or a quartz fiber or sapphire fiber. The optical fiber is fixed to the receptacle by means of protective refractory material 3 made of aluminum oxide, resin coated sand, magnesia carbon, zirconium oxide or graphite mixed with organic and inorganic binders. The protective refractory material provides a structural support to the fiber as well as prevents the penetration of metal into the lance. A clip 4 is attached to the back portion of the optical fiber. This clip ensures the proper alignment between the sensor probe and the rest portion of the device.

The coupling between the optical fiber of the probe and the lance 13 is slightly different in these the embodiments shown in FIGS. 1 and 2. In one embodiment, as shown in FIG. 1, a pin 5 is fixed to the clip and this pin connects to the connector present on the lance. Alternatively in another embodiment, as shown in FIG. 2, the pin present on the lance and a slot 16 for the pin is present on the sensor. The whole arrangement is firmly fixed to the tube 6, preferably made of paperboard material.

In another embodiment as shown in the FIG. 4 the optical fiber is partially or fully covered on the top side by a refractory material 7 of known emissivity and good thermal conductivity. This refractory covering prevents the optical fiber from coming directly in contact with the molten metal. This ensures greater versatility of the system for it can be used for measuring the temperature of any metal. In addition, it reduces errors arising on account of external sources since the fiber is shielded from all external sources. In a further exemplary embodiment as shown in the FIG. 5, the optical fiber 2 is contained within a tube made of metal or quartz or any other material capable of withstanding of high temperature. In addition to providing structural support this tube also shields the fiber from external radiation sources and shifts the emissivity towards blackbody emissivity.

As shown in the FIG. 3, the above described setup is connected to the lance 13 by a contact block 12 within which is contained a connector 11. The combination of these two connector device 11, 12 ensures proper alignment of the optical fiber 2 contained within the probes as described in FIG. 1, 2, 4 or 5 and the armored optical cable 9 contained within the lance. The optical cable receives the signal from the fiber 2 and transmits it to the remote end of the lance, where the optical cable is connected to a signal detection unit 10. In the signal detection unit the optical signal is converted into its equivalent digital value by using photo-detector circuits. The converted digital signal is directed to the computer 15 via cable 14. The cable 14 can be an electrical cable carrying a millivolt signal or a serial cable carrying a digital cable carrying the digital output or an Ethernet cable carrying the digital output to the computer. Cable 14 can also be any cable capable of carrying a signal to computer. The computer 15 is used as arithmetic and logical processing unit where the digital signal is interpreted to any suitable physical value like temperature. It is also possible to replace the computer with other microprocessor based arithmetic and logical processing units. It is also possible to combine the photo-detector circuitry and the numerical processing into a single unit.

In accordance with yet further aspect of the invention the detector module can be a simple photo-detector circuitry or alternatively in some case where the subsequent temperature measurement is necessary the detector module can be modified by using multi-color pyrometer technique. In this method, initially two wavelengths are randomly selected (or selected by the user) and the temperature is computed using a 2-color pyrometry formula. Using the initial guess, the temperature is refined for multicolor (at least 3 color) pyrometry.

A calibration light source is used to calibrate the sensor before every measurement to reduce the errors due to improper connections.

It is thus possible by way of the present advancement to provide for an immersion type temperature sensor which can be used to measure varying ranges of temperature of wide variety of metal. The sensor of the invention is also suitable for temperature measurement in steel industry, in aluminum smelting and in foundries with little or no changes. Furthermore the device is cost effective, user friendly and easy to manufacture.

Additional modifications and improvements of the present invention may also be apparent to those skilled in the art. Thus, the particulars combination of parts described and illustrated herein is instead to represent preferred embodiments of the present invention, and is not intended to serve as limitations of alternative devices or/and combinations within the spirit and scope of the invention.

EXAMPLE

The molten metal temperature measuring system as described in the present invention is used to carry out the desired accurate molten temperature measurement as well as accurate and faster measurement.

The measurement following the system of the invention was carried out following the protocol as detailed under the following Example:

EXAMPLE

Measurement of Molten Temperature Involving the System of the Present Invention For the purposes of measurement of the molten metal temperature the immersion type sensor for measurement of temperatures of molten metal in accordance with the present invention was used.

For the purposes of measurement the following steps were followed:

immersing the probe receptacle having an optical fiber into the molten metal;

a. b. collecting the optical signals including emitted radiations from the molten metal via the optical fiber housed in the probe receptacle;

b. directing the optical signal towards the detector module and carrying out processing of the optical signal in said detector module to measure the temperature of molten metal involving the combination of two color pyrometry and multi-color pyrometry.

A comparative molten metal temperature measurement was studied following the method involving the system of the invention as above with respect to related data involving thermocouple and non-contact pyrometer based techniques.

The comparative performance study results obtained are as presented in the following table which demonstrates the advantages of the present invention over the other molten temperature measuring systems presently available.

The performance of the measuring system and methodology as per the present invention was next studied in relation to the presently known Thermocouple and Non Contact Pyrometer and the results obtained are provided hereunder in Table I:

TABLE I

| Thermocouple | | Non-contact pyrometer | | Following the Example as above of The Present Invention | |
|---|---|---|---|---|---|
| Measuring temperature (° C.) | Measuring time(s) | Measuring temperature (° C.) | Measuring time(s) | Measuring temperature (° C.) | Measuring time(s) |
| 1519 | 5 | 1550 | 2 | 1521 | 2 |
| 1534 | 4 | 1520 | 2 | 1531 | 2 |
| 1552 | 5 | 1561 | 2 | 1554 | 2 |

These results indicate that the method of the present invention apart from being accurate is also faster compared to the thermocouple based temperature measurement. As regards the non contact type measurement while the same may also provide faster results but the measuring technique clearly involves problems of accurate determination of molten metal temperature due to various limitations of the method such as environmental moisture, distance from the measuring system etc. The above results clearly and sufficiently reveal the advantages of the present system and method of measurement involving the same which is found to be superior not only in terms of faster measurement but also accurate measurement and most importantly serving the need for repetitive use of the device/system of the invention which makes the present advancement more user friendly and cost-effective as well and is supposed to serve as a ready and fast accurate measurement of temperature of molten metal and the like.

Although exemplary embodiments of the present invention have been described for illustrative purposes, those skilled in the art will appreciate that various alterations and modification are possible, without departing from the scope and spirit of the present invention as disclosed in the appended claims.

I claim:

1. An immersion type sensor for measurement of temperatures comprising:
   a probe receptacle adapted for connecting to a lance and for immersion in molten metal;
   a first optical fiber housed within the probe receptacle configured to collect radiation emitted by the molten metal, wherein the first optical fiber is arranged within the receptacle to optically couple to a separate second optical fiber housed within the lance; and
   a covering refractory material covering a first end of the first optical fiber that is immersed in the molten metal.

2. An immersion type sensor as claimed in claim 1 wherein said probe receptacle comprises a protective refractory material surrounding sides of the first optical fiber firmly holding the first optical fiber in place in said probe receptacle.

3. An immersion type sensor as claimed in claim 2 wherein the protective refractory material comprises one or more of the following components: aluminum oxide, resin-coated sand, magnesia carbon, graphite, zirconia etc., mixed with organic and inorganic binders.

4. An immersion type sensor as claimed in claim 2 wherein the protective refractory material comprises a solid block of refractory material wherein the first optical fiber runs centrally through at least a portion of the solid block and wherein the solid block comprises one or a combination of the following components: aluminum oxide, graphite, magnesia carbon, zirconia and the like.

5. An immersion type sensor as claimed in claim 1 wherein said first optical fiber in said probe receptacle is provided with a coating of buffer material or coating material comprising metallic elements to improve the strength of the first optical fiber.

6. An immersion type sensor as claimed in claim 1 wherein the probe receptacle comprises one or a combination of the following components: resin coated sand, Aluminium oxide, cordierite, magnesia carbon, graphite, zirconia etc; plastic including Bakelite and metal including stainless steel.

7. An immersion type sensor as claimed in claim 1 wherein the first optical fiber comprises one or more of the following components: silica glass, plastic coated silica, quartz and sapphire, calcium fluoride, magnesium fluoride.

8. An immersion type sensor as claimed in claim 1 wherein the probe receptacle further comprises a cup shaped refractory covering having a flange configured to abut to an end of a tube, wherein the first optical fiber is housed within the probe receptacle and the covering refractory material at the first end of the first optical fiber is exposed so that it directly contacts the molten metal when immersed in the molten metal.

9. An immersion type sensor as claimed in claim 1 wherein the comprises carbon.

10. An immersion type sensor as claimed in claim 1 comprising said probe receptacle operatively connected to a lance adapted for multiple immersion in molten metal and multiple measuring of molten metal temperature.

11. An immersion type sensor as claimed in claim 10 wherein the probe receptacle is operatively connected to the lance to facilitate the immersion of the probe receptacle having the optical fiber into the molten metal and taking it out after use.

12. An immersion type sensor as claimed in claim 1 further comprising a detector module for decoding optical signals received from the first fiber, wherein said detector module is operatively connected to the first optical fiber via the second optical fiber housed in the lance.

13. An immersion type sensor as claimed in claim 12 wherein said detector module comprises:
photo-detector circuitry adapted to generate digital signals according to the optical signals received via the second optical fiber and corresponding to at least two wavelengths; and
a processor adapted to process the digital signals to determine a temperature value of molten metal when the probe receptacle is immersed in the molten metal.

14. An immersion type sensor as claimed in claim 12 wherein said detector module comprises a pyrometer adapted for sensing the temperature of the molten metal based on the input signal received from the said first optical fiber.

15. An immersion type sensor as claimed in claim 1 further comprising a calibration light source to calibrate the immersion type sensor before every immersion in molten metal.

16. An immersion type sensor as claimed in claim 1 wherein said first optical fiber is adapted for measuring temperatures from 150° C.-2000° C.

17. An immersion type sensor as claimed in claim 1 wherein said refractory covering is provided with surface roughness to improve emissivity.

18. An immersion type sensor as claimed in claim 1 comprising a refractory protective material encasing the entire probe receptacle.

19. An immersion type sensor as claimed in claim 1 wherein the first optical fiber is encased in a protective tubular sheath which in turn is affixed to the probe receptacle with a protective material.

20. An immersion type sensor as claimed in claim 1 wherein the optical fiber is selectively provided for measuring temperature of molten metal selected from any metal in the periodic table.

21. A method for measurement of temperature of molten metal involving an immersion type sensor comprising acts of:
attaching a probe receptacle to a lance so that a first optical fiber housed in the probe receptacle optically couples to a second optical fiber housed within the lance, wherein a covering refractory material covers a first end of the first optical fiber that is arranged to be immersed in the molten metal;
immersing the probe receptacle having the first optical fiber into the molten metal;
collecting optical signals from the molten metal via the first optical fiber housed in the probe receptacle;
directing the optical signals towards a detector module and carrying out processing of the optical signals in said detector module to measure the temperature of the molten metal.

22. A method as claimed in claim 21 wherein said temperature of the molten metal is detected in said detector module using multi-color pyrometry techniques and is based on the optical signals received from said first optical fiber.

23. A method as claimed in claim 22 wherein said multi-color pyrometry techniques comprises:
receiving the optical signals in said detector module;
estimating a first temperature by using a two-color pyrometry formula, where two wavelengths are randomly selected from the received optical signals; and
refining the estimated first temperature by using a multi-color pyrometry technique.

24. A method as claimed in claim 21 comprising calibrating the sensor using a known light source before every immersion.

* * * * *